(12) United States Patent
Tsurumaki et al.

(10) Patent No.: US 6,669,019 B2
(45) Date of Patent: Dec. 30, 2003

(54) LIGHT-SHIELDING CONTAINER FOR LIGHT-SENSITIVE MATERIAL USING LIGHT-SHIELDING CLOTH AND LIGHT-SENSITIVE MATERIAL PACKAGE

(75) Inventors: Satoru Tsurumaki, Kanagawa (JP); Masazumi Tomoda, Fukui (JP); Toshihiro Kondou, Fukui (JP)

(73) Assignees: Fuji Photo Film Co., Ltd., Kanagawa (JP); Seiren Co., Ltd., Fukui (JP)

( * ) Notice: Subject to any disclaimer, the term of this patent is extended or adjusted under 35 U.S.C. 154(b) by 138 days.

(21) Appl. No.: 10/029,154

(22) Filed: Dec. 28, 2001

(65) Prior Publication Data

US 2002/0122916 A1 Sep. 5, 2002

(30) Foreign Application Priority Data

Dec. 28, 2000 (JP) .......................... 2000-399885
Oct. 26, 2001 (JP) .......................... 2001-329094

(51) Int. Cl.$^7$ .................... B65D 85/67; D04B 21/02; D04B 21/04; G03C 3/00
(52) U.S. Cl. .................... 206/389; 206/409; 206/455; 428/88; 428/92; 428/97; 224/908
(58) Field of Search .................... 428/92, 97, 89, 428/88, 34.1, 34.5, 36.1; 206/389, 409, 316.1, 455; 224/908

(56) References Cited

U.S. PATENT DOCUMENTS

| | | | | |
|---|---|---|---|---|
| 4,568,590 A | * | 2/1986 | Iwai | 428/85 |
| 4,730,778 A | * | 3/1988 | Akao et al. | 242/588.5 |
| 5,271,983 A | * | 12/1993 | Ise et al. | 428/92 |
| 5,275,283 A | * | 1/1994 | Akao | 242/348.4 |
| 5,308,009 A | * | 5/1994 | Mizuno | 242/348.4 |
| 5,341,188 A | * | 8/1994 | Kawasaki et al. | 396/518 |
| 5,358,198 A | * | 10/1994 | Lesley | 242/348.4 |
| 5,539,964 A | * | 7/1996 | Russum et al. | 26/29 R |
| 5,794,777 A | * | 8/1998 | Akao et al. | 206/409 |
| 5,860,613 A | * | 1/1999 | Holland | 242/348.4 |
| 5,971,311 A | * | 10/1999 | Fujii et al. | 242/348.4 |
| 2003/0072910 A1 | * | 4/2003 | Tsurumaki et al. | 428/92 |

FOREIGN PATENT DOCUMENTS

| | | | | |
|---|---|---|---|---|
| EP | 452900 A2 | * | 10/1991 | D04B/21/02 |
| JP | 62-40696 | | 8/1987 | |
| JP | 63123041 A | * | 5/1988 | G03C/03/00 |
| JP | 02093456 A | * | 4/1990 | G03C/03/00 |
| JP | 2000-035635 | | 2/2000 | |
| JP | 2002258445 A | * | 9/2002 | G03C/03/00 |

* cited by examiner

Primary Examiner—Cheryl A. Juska
(74) Attorney, Agent, or Firm—Sughrue Mion, PLLC

(57) ABSTRACT

A light-shielding container for a light-sensitive material has a light-shielding cloth attached to an opening in the container through which the light-sensitive material is passed. The light-shielding cloth shields the opening from light and is formed from a base fabric and a pile section. The pile section includes black dope-dyed threads formed by incorporating black dope-dyed threads containing carbon black into the base fabric and black-dyed threads formed by incorporating black-dyed threads. The proportion of the black dope-dyed threads in the total pile is 5 wt % to 60 wt %. The single filament fineness of the black dope-dyed threads is thicker than that of the black-dyed threads. The overall pile density of the black dope-dyed threads and the black-dyed threads is 30,000 to 55,000 filaments/cm$^2$. The black dope-dyed threads and the black-dyed threads are arranged in stripes substantially orthogonal to the direction in which the light-sensitive material is passed.

12 Claims, 3 Drawing Sheets

LIGHT-SHIELDING CONTAINER FOR LIGHT-SENSITIVE MATERIAL USING LIGHT-SHIELDING CLOTH AND LIGHT-SENSITIVE MATERIAL PACKAGE

BACKGROUND OF THE INVENTION

1. Field of the Invention

The present invention relates to a light-shielding container that houses a light-sensitive material such as printing paper, light-sensitive material for printing or color negative film for photography and also to a light-sensitive material package containing the container and a light-sensitive material housed therein. In particular, the present invention relates to a light-shielding container having good light-shielding properties in the infrared region and also to a light-sensitive material package containing the container and a light-sensitive material housed therein.

2. Description of the Related Art

Photographic 35 mm roll film, etc. is used in a state in which it is housed in a light-shielding container called a cartridge. As is well known, this cartridge is essentially formed from a tubular iron shell, a spool as a core for winding the film housed in the shell into a roll form, and two caps for closing opposite ends of the shell. Moreover, a light-shielding cloth, generally called plush (also called teremp), is bonded to the inner surfaces of a film passage opening of the above-mentioned shell.

Since the light-shielding cloth is required to prevent unused film from being exposed to light and should also not interfere with the smooth drawing out and rewinding of the film, a light-shielding cloth structure having a pile being made of a flexible material on a surface of a base fabric is used as the light-shielding cloth.

Conventionally, light-shielding cloth structures of this kind are produced by weaving or knitting superimposed woven cloths or knitted cloths with a pile thread so as to combine the cloths thus giving double woven or knitted cloths, and then cutting the pile thread along a plane that is substantially central between the two woven or knitted cloths (JP-A-62-98347; JP-A denotes Japanese unexamined patent application publication). The pile of the so-called plush is in contact with the photographic film so preventing the film from being exposed to light, and its flexibility and resistance to the drawing out of photographic film are sufficient for ordinary use.

As a material for the light-shielding cloth structure, polyester thread, which is cost-efficient, has been used recently. Although the light-shielding cloth structure is usually colored black, the dyeing of polyester has problems. Polyester is a linear macromolecule formed from poly(ethylene terephthalate) and has an extremely high proportion of crystalline sections, and its non-crystalline sections are comparatively dense. Accordingly, it is a fiber having low hygroscopicity and high hydrophobicity. As is described in 'Coloring Technology', by Tomizo Hamanaka, (Jitsukyo Publishing), etc., a water-soluble dye having a high molecular weight cannot enter a polyester fiber, thereby resulting in little dyeing of the fiber. It is mainly only hydrophobic disperse dyes having a comparatively low molecular weight that can be used as dyes for polyester.

Various types of black disperse dye suitable for dyeing polyester are commercially available from various companies. However, among these disperse dyes, none has absorption over a wide range of wavelengths that includes the infrared region. In order to improve this aspect, as described in JP-A-11-295855 a coloring agent known as an infrared absorbing agent is commercially available, but not only this is expensive but also sufficient absorption cannot be achieved at present over a wide range of wavelengths that includes the infrared region.

On the other hand, current silver halide photosensitive materials have, as is well known, various spectral sensitivities. For example, there are materials such as normal color negative films and color reversal films that are spectrally sensitized over substantially the whole visible light region (400 nm to 700 nm) and materials such as infrared films that are spectrally sensitized to the infrared region (to the long wavelength side above 700 nm, for example, 850 nm or more). When they are spectrally sensitized in the visible light region, the spectral sensitization profile differs slightly among different types of product, and the longest wavelength of the spectral sensitization thereof also differs.

It is therefore difficult to achieve sufficient light-shielding properties for all light-sensitive materials by the use of conventional light-shielding cloth, since the longest spectrally sensitive wavelength values of the light-sensitive materials vary. It is surmised that this is mainly due to the comparatively weak absorption of the conventional light-shielding cloth in the infrared region.

In order to tackle such a problem in the light-shielding properties, JU-B-37-21388 (JU-B denotes Japanese examined utility model application publication), JU-B-46-28218, JP-B-62-40696 (JP-B denotes Japanese examined patent application publication) and JP-A-2-93456 have proposed a light-shielding cloth employing black dope-dyed thread that has been colored black by incorporating carbon black into a starting thread. In general, carbon black has good light absorption over a wide range of wavelengths including ultraviolet light, visible light, and infrared light as described in JP-A-2000-35635, and the light-shielding cloth thus obtained can therefore find application with light-sensitive materials having spectral absorption in various wavelength regions. As described above, although the use of a black dope-dyed thread in a light-shielding cloth has been proposed, there is the following problem. Since carbon black is incorporated into the thread, the thickness of the black dope-dyed thread inevitably increases. When a light-shielding cloth formed from 100% of a black dope-dyed pile thread is used in a film passage opening, although light-shielding properties over a wide range of wavelengths including the ultraviolet, visible and infrared regions can be obtained, the resistance to drawing out film increases. It is thereby difficult to simultaneously satisfy requirements for the light-shielding properties and the drawing resistance.

BRIEF SUMMARY OF THE INVENTION

The present invention has been carried out in view of the above-mentioned circumstances, and it is an object of the present invention to provide a light-shielding container for a light-sensitive material, the container employing a light-shielding cloth that has good light-shielding properties in the infrared region and a low resistance to the drawing out of photographic film. Another object of the present invention is to provide a light-sensitive material package formed from a light-shielding container and a light-sensitive material housed therein, the container having good light-shielding properties in the infrared region and a low resistance to the drawing out of photographic film.

A first aspect of the present invention provides the following problem-solving means.

(1) A light-shielding container for a light-sensitive material, including a light-shielding cloth attached to an opening in the container through which the light-sensitive material is passed, the light-shielding cloth shielding the opening from light and including a base fabric and a pile section formed by incorporating pile threads into the base fabric, the pile section including a black dope-dyed thread pile section formed by incorporating black dope-dyed threads containing carbon black and a black-dyed thread pile section formed by incorporating black-dyed threads, wherein the proportion of the black dope-dyed thread pile section in the total pile section is 5 wt % to 60 wt %, wherein the single filament fineness of the black dope-dyed threads is thicker than that of the black-dyed threads, wherein the overall pile density of the black dope-dyed threads and the black-dyed threads is 30,000 filaments/cm$^2$ to 55,000 filaments/cm$^2$, and wherein the black dope-dyed thread pile section and the black-dyed thread pile section are arranged in stripes that are substantially orthogonal to the direction in which the light-sensitive material is passed.

A second aspect of the present invention provides the following problem-solving means.

(7) A light-sensitive material package including a light-shielding container for a light-sensitive material and a light-sensitive material that has sensitivity to light at 850 nm and is housed in the container, the light-shielding container for a light-sensitive material including a light-shielding cloth attached to an opening in the container through which the light-sensitive material is passed, the light-shielding cloth shielding the opening from light and including a base fabric and a pile section formed by incorporating pile threads into the base fabric, the pile section including a black dope-dyed thread pile section formed by incorporating black dope-dyed threads containing carbon black and a black-dyed thread pile section formed by incorporating black-dyed threads, wherein the proportion of the black dope-dyed thread pile section in the total pile section is 5 wt % to 60 wt %, wherein the single filament fineness of the black dope-dyed threads is thicker than that of the black-dyed threads, wherein the overall pile density of the black dope-dyed threads and the black-dyed threads is 30,000 filaments/cm$^2$ to 55,000 filaments/cm$^2$, and wherein the black dope-dyed thread pile section and the black-dyed thread pile section are arranged in stripes that are substantially orthogonal to the direction in which the light-sensitive material is passed.

The overall pile density in the present invention is expressed by the number of single filaments per square centimeter.

DETAILED DESCRIPTION OF THE INVENTION

Figure 1:
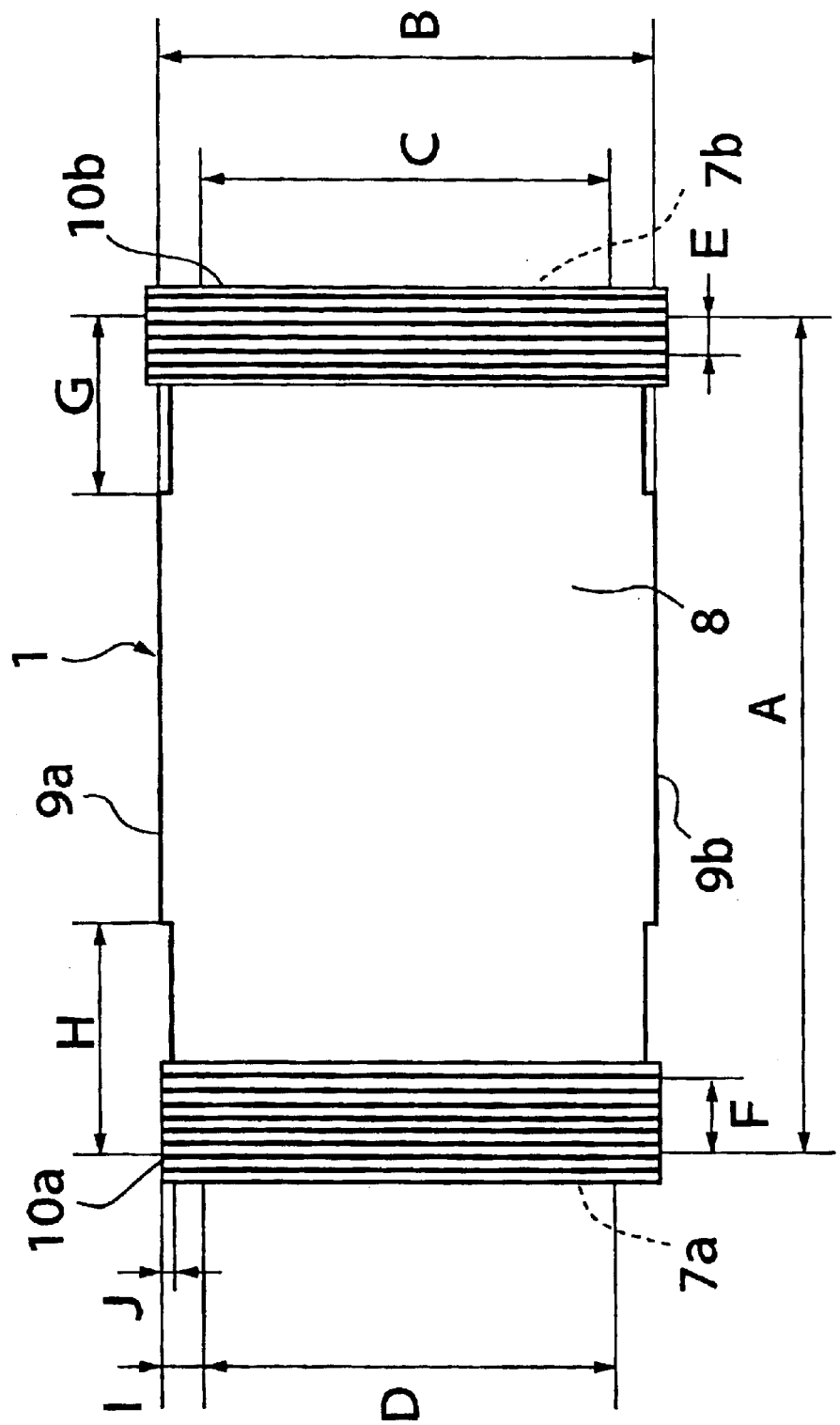
FIG. 1 is a front view of one example of a shell-forming metal sheet having two pieces of light-shielding cloth bonded to the right and left edges thereof using long ribbons of light-shielding cloth related to the present invention.

Preferred embodiments in accordance with the first aspect of the present invention are listed below.

(2) The light-shielding container for a light-sensitive material according to the above-mentioned (1), wherein the average single filament fineness (decitex) given by the equation below is in the range of 1 to 2, where A denotes the single filament fineness of the black dope-dyed threads, X wt % denotes the proportion of the black dope-dyed threads in the pile section, B denotes the single filament fineness of the black-dyed threads, and Y wt % denotes the proportion of the black-dyed threads in the pile section, Average Single Filament Fineness=$\{A \times (X/100) + B \times (Y/100)\}/2$ (3) the light-shielding container for a light-sensitive material according to either of the above-mentioned (1) or (2), wherein the single filament fineness of the black-dyed threads is 2 decitex or less, (4) the light-shielding container for a light-sensitive material according to any one of the above-mentioned (1) to (3), wherein the pile threads forming the black dope-dyed threads and the black-dyed threads are crimped threads, (5) the light-shielding container for a light-sensitive material according to any one of the above-mentioned (1) to (4), wherein the base fabric is a warp knitted structure formed from a chain thread and an inlay thread, and (6) the light-shielding container for a light-sensitive material according to any one of the above-mentioned (1) to (5), wherein the light-shielding cloth is prepared using the black dope-dyed threads and, instead of the black-dyed threads, undyed threads that have not been dyed black, and the whole light-shielding cloth is then dyed black using a dye to convert the undyed threads into the black-dyed threads.

Furthermore, preferred embodiments in accordance with the second aspect of the present invention are listed below.

(8) The light-sensitive material package according to the above-mentioned (7), wherein the average single filament fineness (decitex) given by the equation below is in the range of 1 to 2, where A denotes the single filament fineness of the black dope-dyed threads, X wt % denotes the proportion of the black dope-dyed threads in the pile section, B denotes the single filament fineness of the black-dyed threads, and Y wt % denotes the proportion of the black-dyed threads in the pile section, Average Single Filament Fineness=$\{A \times (X/100) + B \times (Y/100)\}/2$ (9) the light-sensitive material package according to either of the above-mentioned (7) or (8), wherein the single filament fineness of the black-dyed threads is 2 decitex or less,

(10) the light-sensitive material package according to any one of the above-mentioned (7) to (9), wherein the pile threads forming the black dope-dyed threads and the black-dyed threads are crimped threads,

(11) the light-sensitive material package according to any one of the above-mentioned (7) to (10), wherein the base fabric is a warp knitted structure formed from a chain thread and an inlay thread, and

(12) the light-sensitive material package according to any one of the above-mentioned (7) to (11), wherein the light-shielding cloth is prepared using the black dope-dyed threads and, instead of the black-dyed threads, undyed threads that have not been dyed black, and the whole light-shielding cloth is then dyed black using a dye to convert the undyed threads into the black-dyed threads.

The Present Invention is Explained in Detail Below.

'Black dope-dyed thread' means thread obtained by incorporating carbon black into the starting thread to give a black-colored fiber. In general, carbon black has good light absorption over a wide range of wavelengths including ultraviolet light, visible light, and infrared light, and the thread can be used with light-sensitive materials having a spectral absorption in various wavelength regions and, in particular, in the infrared region, thereby maintaining light-shielding properties.

In the present invention, in addition to the black dope-dyed thread, 'black-dyed thread' obtained by coloring a fiber black using a dye is used in combination to form pile threads.

The 'black-dyed thread' referred to in the present invention is a black-dyed thread in a light-shielding cloth glued to a light-shielding container for a light-sensitive material, and it may or may not be dyed black when manufacturing the light-shielding cloth.

The light-shielding container for a photosensitive material of the present invention is not particularly limited, but it is preferably a 135 size film cartridge.

The light-shielding cloth that is disposed in a film passage opening of the light-shielding container for a light-sensitive material of the present invention is formed from a 'base fabric section', which is a section of base fabric, and a 'pile section', which is formed from pile threads incorporated into the base fabric section. The pile section is formed from a compact erect pile having a uniform length. The pile here is made from a multi-filament thread. As described below, a crimped bulky black dope-dyed thread (in the present invention, also called a 'black dope-dyed processed thread') and a crimped black-dyed thread (in the present invention, also called 'black-dyed processed thread') are preferably used in the present invention.

Examples of the base fabric of the light-shielding cloth used in the present invention include those having a woven structure comprising a warp and a weft, those having a knitted structure comprising a chain thread and an inlay thread and those knitted and teaseled. Those having a warp knitted structure comprising a chain thread and an inlay thread are particularly preferred.

Furthermore, 'incorporated into a base fabric' means woven into a woven fabric or to knitted into a knitted fabric.

In the present invention, the pile section of the light-shielding cloth forms light-shielding layers that face each other and are placed on opposite sides of the opening, that is to say, a slit-form aperture through which the light-sensitive material is passed, and allows the light-sensitive material to be passed through while making contact with the moving light-sensitive material, preventing visible light and infrared light from entering the inside of the light-shielding container, avoiding any damage to the light-sensitive material, and reducing the drawing resistance.

As a result of an intensive investigation by the present inventors, it has been found that, in order to impart to a light-shielding cloth good absorption in the visible and infrared regions and good compression characteristics including low frictional resistance when drawing out a film, it is important to appropriately choose the density and type of the pile threads, the mixing ratio of the black dope-dyed threads and the black-dyed threads, and the arrangement in which they are combined, and the present invention has thus been accomplished.

That is to say, the light-shielding cloth of the present invention is a cloth having a pile section, and is a light-shielding cloth obtained by incorporating black dope-dyed threads into a base fabric at a mixing proportion of 5 wt % to 60 wt % in the pile section. The overall pile density of the pile section that is formed from the black dope-dyed threads and the black-dyed threads is 30,000 to 55,000 filaments/cm$^2$ of the base fabric, and preferably 40,000 to 50,000 filaments/cm$^2$. When the pile density is less than 30,000 filaments/cm$^2$, there is a possibility that the light-shielding properties might be degraded. When it exceeds 55,000 filaments/cm$^2$, there is a possibility that the resistance to drawing out film might increase and the manufacturability of the cloth might be degraded. With regard to the pile threads for the light-shielding cloth used in the light-shielding container of the present invention, filament thread is preferred over spun thread in terms of dropping-out and fluff. It is also preferable to use bulky thread obtained by subjecting filament thread of both the black dope-dyed thread and the black-dyed thread to crimping. This bulky thread improves the light-shielding properties by changing the shape of the thread fibers so as to increase the bulkiness.

With regard to methods of producing black dope-dyed threads used in the light-shielding cloth in the present invention, there are an addition-during-polymerization method (JP-B-51-29900) in which carbon black, which is a coloring agent, is added during polymerization; an addition-prior-to-spinning method in which pellets are formed in a pre-spinning step by mixing a starting material polymer with masterbatch pellets in which carbon black has been uniformly dispersed, and spinning is carried out using the pellets so formed; and an injection-during-spinning method in which molten masterbatch pellets containing carbon black are mixed with starting material polymer pellets in an extruder spinning machine and spinning is carried out while mixing by means of a screw. Any production method can be employed, but the addition-prior-to-spinning method is, in general, suitable. The particle size of the carbon black used here as a coloring agent is preferably 1 $\mu$m or less. When it is larger than 1 $\mu$m, there is the possibility that the physical properties of the threads such as strength might be degraded. The proportion of carbon black mixed with the polymer is 1 wt % to 10 wt % of the polymer mixture (mixture of the polymer and the black carbon). When the mixing proportion is less than 1 wt %, it causes the problem of insufficient light-shielding properties in the infrared region. When it exceeds 10 wt %, it causes problems in that spinning cannot be carried out and the physical properties of the threads such as strength are degraded.

With regard to a method of producing bulky filament threads, a conventionally known method can be employed, and a method in which filament threads are subjected to crimping can be cited as a representative method. With regard to a specific method of crimping, a conventionally known method can be employed, but a false twist method is preferred in which a filament thread is twisted by means of rollers having a smooth surface and then crimped in a stuffing box heated with a heater by adjusting the heater temperature, the residence time in the box and the drawing speed. In order to impart light-shielding properties and good compression characteristics to the pile threads, it is desirable to use as the crimping method a two heater false twist method in which, subsequent to crimping by a normal false twist method, the thread is fed again into a heater using overfeed so as to re-set it. The thread crimped by this method has a stable, low stretchability, has very good bulkiness and is soft to the touch. Since the thread obtained by the normal false twist method employing one heater has a large contractive force, its length and compression characteristics are unstable. When it is used as a pile thread, it is difficult to obtain appropriate compression characteristics.

In the pile section of the light-shielding cloth of the present invention, which is formed from the black dope-dyed thread and the black-dyed thread, it is preferable to use multifilament threads in which the total fineness of the threads is 55 decitex to 111 decitex, the single filament fineness of the black dope-dyed threads is 0.6 decitex to 3.0 decitex, and the single filament fineness of the black-dyed threads is 0.5 decitex to 2.0 decitex.

In the light-shielding cloth used in the present invention, it is essential that the single filament fineness of the black dope-dyed threads is greater than that of the black-dyed threads.

The use of black-dyed threads having a single filament fineness that is less than that of the black dope-dyed threads can provide excellent light-shielding properties and drawing resistance.

When the single filament fineness is less than 0.5 decitex, the single thread strength becomes poor, thereby raising the possibility that fluff might occur. When it exceeds 3.0 decitex, the drawing resistance might increase. The multifilament threads of the present invention are preferably synthetic fibers and are particularly preferably formed from a polyester such as poly(ethylene terephthalate) or a polyamide such as nylon-6,6.

In the light-shielding cloth used in the present invention, the average fineness (decitex) of the single threads is 1 to 2, and preferably 1.2 to 1.6.

Adding titanium oxide to the synthetic fiber used in the present invention and, in particular, to the black-dyed threads, generally gives a delustering effect. The fiber can be roughly divided into full dull, semi dull, bright, and super bright (no added titanium oxide) according to the amount of titanium oxide added. There is a tendency for the color density and intensity to increase as the amount of titanium oxide is decreased. In order to enhance the light-shielding properties without increasing the dye concentration, super bright grade threads to which no titanium oxide has been added are preferably used.

In the light-shielding cloth of the present invention, the pile thickness (thickness including the base fabric and pile threads) is preferably 1 mm to 2 mm.

Furthermore, in the light-shielding cloth of the present invention, the black-dyed threads are obtained by dyeing the thread black using a generally known dyeing method in order to impart light-shielding properties thereto.

The threads other than the black dope-dyed threads are preferably polyester threads and can be dyed with a black disperse dye known in the art. Such a disperse dye is a known dye that is used for cartridge ribbon formed from polyester.

With regard to the timing of dyeing, the black-dyed threads may be produced prior to producing a light-shielding cloth. Alternatively, after a light-shielding cloth is produced using an undyed polyester thread as the pile thread, the whole light-shielding cloth can be dyed with a black disperse dye.

In the latter case, although the black dope-dyed threads are dyed as well, they are little affected thereby.

In the present invention, the 'black dope-dyed threads' include black dope-dyed threads that are dyed black as described above.

Examples of the disperse dye include: Foron Black S-100 (Clariant), Sumikaron Black S-BL(N)liq (Sumitomo Chemical), Sumikaron Black S-BGL(N) conc.liq (Sumitomo Chemical), Dianix Black BG-FS200% 01 (DyStar), Dianix Tuxedo Black F conc.liq. (DyStar), Dianix Tuxedo Black H conc.liq 01 (DyStar), Terasil Black RLW-01 liq. 75% (Ciba Specialty Chemicals), Terasil Black SRL-01 200% (Ciba Specialty Chemicals), Kayalon Polyester Black ECX paste 150 (Nippon Kayaku), Dispersol Black XF GRS (Mitsui BASF), Palanil ECO Black CC liquid, Palanil ECO Black CC-S liquid (Mitsui BASF), and Disperse Black NRS conc.paste (Mitsui BASF).

The adhesive area of the light-shielding cloth of the present invention via which it is bonded to the container (cartridge) main body is preferably formed from a single layer of a hot-melt adhesive or a double-layer structure in which a filling agent is coated in order to prevent the hot-melt adhesive from penetrating to the pile side and the hot-melt adhesive is then coated on the surface of the filling agent. The adhesive area may be in the form of stripes or islands but the adhesive preferably forms a thin continuous area and particularly preferably forms a continuous adhesive layer.

With regard to examples of the filling agent, as disclosed in JP-A-62-55649, JP-A-62-71949, JP-A-62-27733 and JP-A-2-72348, there are polyvinyl, polyolefin, polyurethane, polyamide, polyester, synthetic rubber, epoxy, phenol and other acrylic synthetic emulsions; blended emulsions formed from more than one type of the above-mentioned synthetic emulsions; and copolymer emulsions obtained by combining the above-mentioned components.

Examples of the adhesive include commercial double-sided adhesive tapes, adhesives based on, for example, polyolefins such as polyethylene; vinyl acetate copolymers such as ethylene-vinyl acetate copolymer; acrylic acid copolymers such as ethylene-ethyl acrylate and ethylene-isobutyl acrylate; polyamides such as nylon-6, nylon-6,6, nylon-10, nylon-12, and N-methoxymethylated nylon; polyesters such as those derived from terephthalic acid; polyvinyl butyrals; poly(vinyl acetates); cellulose derivatives such as cellulose acetate, methylcellulose and cellulose acetate butyrate; polymethacrylate esters such as poly(methyl methacrylate); poly(vinyl ethers) such as poly(vinyl methyl ether); polyurethanes; polycarbonates; styrene block copolymers such as styrene-ethylene-butylene-styrene; synthetic rubbers such as styrene butadiene, isoprene and butyl rubber; other special rubbers and other acrylic copolymers; and mixtures of more than one type of adhesive chosen from the above-mentioned adhesives.

With regard to a light-shielding cloth suitable for coating with the hot-melt adhesive, it is preferable for the pile density on the pile side to be 30,000 to 55,000 filaments/cm$^2$ and for the pile compression characteristics to be such that the change in thickness is 0.5±0.1 mm under a load of 0.49 N/cm$^2$ and 0.7±0.1 mm under a load of 1.96 N/cm$^2$ when the pile thickness is 1.6 mm or less. These characteristics can be obtained by appropriately combining the thickness, type, processed form, density, length, etc. of the pile threads. A good quality light-shielding cloth having a low drawing resistance and good light-shielding properties when used in a film cartridge can thereby be obtained.

As a result of an intensive investigation by the present inventors, the present invention has been accomplished by developing a light-shielding container for a light-sensitive material that employs a light-shielding cloth formed from black dope-dyed threads and black-dyed threads (including both dyed threads and undyed threads that are dyed after cloth manufacture), such that requirements for the light-shielding properties and the drawing resistance are simultaneously satisfied, and the production cost can be reduced.

If a light-shielding cloth having a pile section formed from black dope-dyed threads alone is used, a desired light-shielding container for a light-sensitive material cannot be obtained. For example, when polyester black dope-dyed processed threads have a size of 84 decitex/36 filaments, which corresponds to a single filament fineness of 2.3 decitex, which is the finest thread among those that can be produced at present, the change in thickness with a load of 1.96 N/cm$^2$ becomes less than 0.6 mm. When a film cartridge is formed using these threads, the drawing resistance is high. In order to obtain the target compression characteristics, polyester black-dyed processed threads having a size of 84 decitex/72 filaments, which corresponds to a single filament fineness of 1.2 decitex, and polyester black dope-dyed processed threads having a size of 84 decitex/36 filaments, which corresponds to a single filament fineness of 2.3 decitex, are mixed to form pile threads, thereby achieving the desired good pile characteristics. In the case of similar black-dyed processed threads, when polyester processed threads having a size of 84 decitex/36 filaments, which corresponds to a single filament fineness of 2.3 decitex, are used, the change in thickness with a load of 1.96 N/cm$^2$ becomes less than 0.6 mm. When a film cartridge is formed using these threads, the drawing resistance is high. Low single filament fineness is therefore preferred. The mixing proportion of the black dope-dyed threads in the pile threads is preferably in the range of 5 wt % to 60 wt %, and more preferably 10 wt % to 30 wt %.

The arrangement in which the black dope-dyed threads and black-dyed threads are incorporated in the pile thread is not particularly limited and may be in the form of stripes or checkers, but a horizontal or vertical stripe form is preferred. When the light-shielding cloth has a woven or knitted structure, an arrangement in which the black dope-dyed threads are incorporated at a fixed proportion in the form of horizontal or vertical stripes is efficient in terms of production, and light-shielding properties can be obtained at low cost. When bonding the light-shielding cloth to the light-shielding container for a light-sensitive material, it is preferable that the direction of the black dope-dyed thread stripes and the black-dyed thread stripes is substantially orthogonal to the direction in which the light-sensitive material is moved. If the light-shielding cloth is bonded to a light-shielding container for a light-sensitive material so that the direction of the stripes is parallel to the direction in which the light-sensitive material is moved, passages for infrared light might be formed depending on the proportion of the black dope-dyed threads in the pile, and there is a possibility that sufficient light-shielding properties might not be obtained in the infrared region. In the present invention, in order to prevent undesirable formation of the above-mentioned infrared light passages, the stripes of black dope-dyed threads are arranged 'substantially parallel' to the film width direction in the opening through which a photographic film, etc. is passed.

When they are arranged in the form of stripes, bundles of the black dope-dyed threads having a size of, for example, 84 decitex/36 filaments are arranged at identical intervals at 4 stripes/cm to 6 stripes/cm. When there are less than 4 stripes/cm of the black dope-dyed thread, sufficient light-shielding properties cannot be obtained. When there are more than 6 stripes/cm, the drawing resistance might increase.

Furthermore, one stripe has a width of 500 μm to 1500 μm. When it is less than 500 μm, sufficient light-shielding properties cannot be obtained. When it exceeds 1500 μm, the drawing resistance might increase.

It is necessary for the thickness of the light-shielding cloth to be set according to the size of the gap of the slit-form opening of the cartridge main body to which the light-shielding cloth is bonded, and it is preferably set at a level that is larger than half the gap size by 0.05 to 0.3 mm. When it is larger by less than 0.05 mm the light-shielding properties might be greatly degraded, and when it is larger by more than 0.3 mm the drawing resistance might increase. The base fabric preferably has a woven or warp knitted structure which gives a smooth base fabric surface and good coatability for adhesives. Among the warp knitted structures, a chain/inlay fabric and a chain/satin fabric disclosed by the present applicant in JU-B-7-50741 are preferred. The use of such a fabric reduces the roughness of the base fabric surface so improving the coating performance, and an intended adhesive strength can be obtained from coating a smaller amount of adhesive. The materials for the pile thread and the base fabric thread used for a light-shielding cloth having the above-mentioned warp knitted or woven structure are preferably formed from a single synthetic fiber, but combinations of more than one type of synthetic fiber can be used.

The light-shielding cloth used in the present invention can be cut (slit) into a required width after making a wide-width product (500 mm or more) or can be made so as to initially have a required width. When manufacturing by cutting it into a required width, it is preferable to slit it parallel to the direction in which the stripes of black dope-dyed threads are arranged. With regard to methods of slitting the wide-width product while preventing pile drop, there are a method of hot melt cutting by means of a hot blade disclosed in JU-B-48-35790 and a method of cutting by means of, for example, an ultrasonic cutter or a laser cutter, and an ultrasonic cutter is preferred.

FIG. 1 is a front view of one example of a shell-forming metal sheet in which two pieces of light-shielding cloth have been bonded to the right and left edges thereof using a long light-shielding cloth. A shell-forming metal sheet 1 includes a port section 7 or port-forming sections 7a and 7b and a tube-forming section 8. Projections 9a and 9b, which are inserted into a lid member and a base member of a photographic film cartridge, are formed on the upper and lower parts of the tube-forming section 8. The shell-forming metal sheet 1 shown in FIG. 1 has a length A in the width direction of 79.75 to 79.85 mm and a length B in the vertical direction of 42.15 to 42.25 mm. The port-forming section 7a has a length D in the vertical direction of 35.8 to 36.0 mm and a length F in the width direction of 7.1 to 7.3 mm. The port-forming section 7b has a length C in the vertical direction of 35.8 to 36.0 mm and a length E in the width direction of 3.4 to 3.6 mm. A length H in the width direction from the edge of the port-forming section 7a to the edge of the projection 9a of the tube-forming section 8 is 21.15 to 21.40 mm. A length G in the width direction from the edge of the port-forming section 7b to the edge of the projection 9a of the tube-forming section 8 is 17.3 to 17.5 mm. A length I in the vertical direction from the edge of the projection 9a of the tube-forming section 8 to the edge of the port-forming section 7a is 3.1 to 3.2 mm. A length J in the vertical direction of the projection 9a of the tube-forming section 8 is 0.5 to 0.6 mm.

Two pieces of light-shielding cloth 10a and 10b shown in FIG. 1 are both formed by cutting long light-shielding cloth ribbons that are bonded to the shell-forming metal sheet 1 so that the two ends of each of the ribbons in the length direction project beyond the tube-forming section 8 by 1 to 2 mm. The light-shielding cloth 10a has a width of 11.4 to 11.6 mm, and the edge in the width direction projects beyond the port-forming section 7a by 1.0 to 2.5 mm. The light-shielding cloth 10b has a width of 9.4 to 9.6 mm, and the edge in the width direction projects beyond the port-forming section 7b by 1.0 to 2.5 mm.

Figure 2:
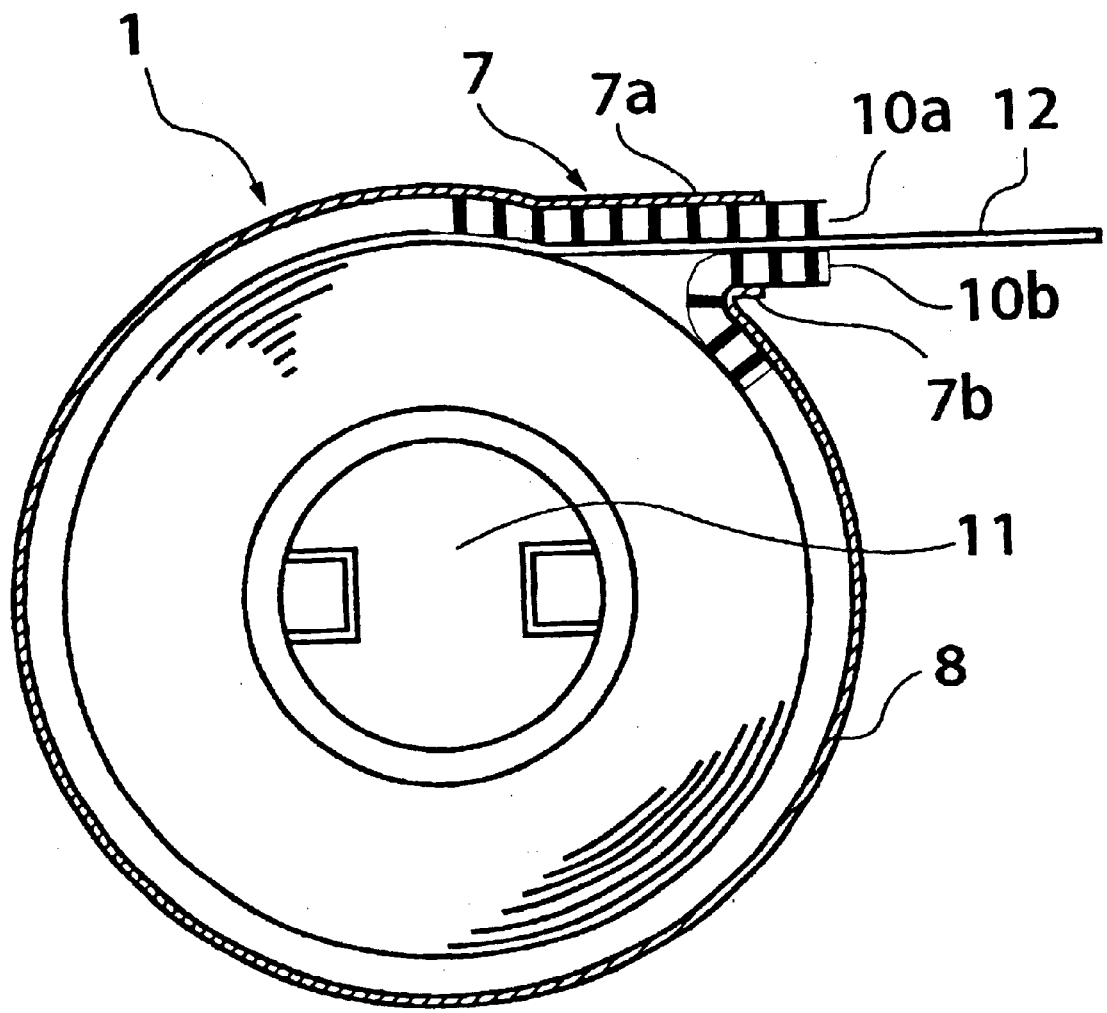
FIG. 2 is a cross section of one example of a photographic film cartridge using the shell-forming metal sheet with the light-shielding cloth shown in FIG. 1.
Figure 3:
FIG. 3 is a front view of a light-shielding cloth used in the present invention illustrating examples of the arrangement of the black dope-dyed thread pile sections (parts colored black correspond to the sections in which the dope-dyed thread is used).
Figure 3:
Figure 3:
Figure 3:
Figure 3:

FIG. 2 is a cross section of one example of a photographic film cartridge formed from the shell-forming metal sheet with light-shielding cloth shown in FIG. 1. A film case of the photographic film cartridge is formed by bending the tube-forming section 8 of the shell-forming metal sheet 1 shown in FIG. 1 into a tube form so that the two pieces of light-shielding cloth 10a and 10b bonded to the port forming sections 7a and 7b come into contact with each other. A photographic film 12 wound around a spool 11 is drawn while the opposite surfaces thereof are in contact with the two pieces of light-shielding cloth 10a and 10b of a port section 7, and the photographic film 12 inside the cartridge is thus shielded from light.

There is no restriction on the width of the light-shielding cloth pieces 10a and 10b as long as they are in contact with the photographic film to an extent that can prevent the photographic film housed inside the cartridge from being exposed to light. For example, it is possible to make two pieces of light-shielding cloth 10a and 10b with a width of 9.4 to 9.6 mm (the width corresponding to the depth from the port orifice of the photographic film cartridge). In particular, taking into consideration the productivity and control of the production of the light-shielding cloth, it is preferable for the two pieces of light-shielding cloth 10a and 10b to have a narrow and identical width. When the two pieces of light-shielding cloth 10a and 10b have a width of 9.4 to 9.6 mm, the length F in the width direction of the port forming section of the shell-forming metal sheet 1 shown in FIG. 1 is preferably 3.5 to 4.0 mm so as to enhance the light-shielding properties of the photographic film cartridge.

When producing a light-shielding cloth, after subjecting the wide-width light-shielding cloth to ultrasonic slitting, the narrow-width light-shielding cloth so formed is wound around a plastic reel while traversing from the top to the bottom of the reel. If the wind tension at this point is too low, the wound form collapses during transport, and it becomes impossible for the narrow light-shielding cloth to be drawn out by the equipment. When the wind tension is too high, the pile is crushed so causing degradation of the light-shielding properties.

The above-mentioned cartridge shell sheet is formed by, for example, firstly cutting a metal sheet into a predetermined shape, forming the sheet into a shape having a substantially boat-shaped cross section, bonding the above-mentioned two pieces of light-shielding cloth to the right and left edges of the metal sheet and then bending the metal sheet into a substantially tube shaped form so that the two pieces of light-shielding cloth face each other.

With regard to practical methods of bonding the light-shielding cloth to the metal sheet, there are a method in which the light-shielding cloth is cut to a predetermined length beforehand, the metal sheet is fed intermittently and the precut light-shielding cloth is bonded to the metal sheet piece by piece when the sheet is stopped, and a method for enhancing the productivity by increasing the speed of the bonding step, in which a plurality of metal sheets are continuously fed in a state in which they are arranged so that the forward end of one sheet is almost in contact with the back end of the foregoing sheet, two long light-shielding cloth ribbons precoated with an adhesive are continuously bonded to the right and left edges respectively of the metal sheets so arranged, and the light-shielding cloth ribbons are then cut by passing a cutter blade between adjoining metal sheets.

The light-shielding cloth of the present invention can be used as, for example, a light-shielding cloth provided at an outlet of a cartridge for various types of light-sensitive material (photographic film, printing paper, light-sensitive resin film, etc.) and a lining for the purpose of light-shielding in a machine handling a photosensitive material (photographic developing machine, etc.). In particular, the light-shielding container of the present invention can be desirably applied to containers having structures in which various types of photographic film are housed and drawn out through an outlet so as to prevent exposure to light, and particularly desirably to cartridges housing various types of sheet-form or roll-form photosensitive material (JIS 135 size photographic film, color printing paper, computer photo-typesetting film and printing paper, thermal paper, light-sensitive resin film, microfilm, X-ray film, etc.). In particular, excellent light-shielding properties can be obtained when applying it to a cartridge for a light-sensitive material that is sensitive to electromagnetic waves in the infrared region. Here, 'sensitive in the infrared region' denotes 'sensitive to infrared light having a wavelength of at least 850 nm.'

EXAMPLES

Examples of the present invention will be explained below, but the present invention is not limited by the following examples.

Example 1

A black dope-dyed thread was prepared by the addition-prior-to-spinning method in which carbon black was added prior to a spinning step. More specifically, an 84 decitex/36 filaments polyester multifilament thread was used, in which the amount of carbon black added was 5 wt % of the polymer resin mixture. The polyester black dope-dyed thread and polyester thread that were used as pile threads were crimped by a two heater false twist method in which the threads were first subjected to crimping by a normal false twist method using a three-shaft outer-contact type false twist friction texturing machine and then continuously fed again to a heater using overfeed so as to re-set them.

The knit fabric for the light-shielding cloth had a chain/inlay structure as disclosed in JU-B-7-50741. The knitted pile material was formed using, as the chain and inlay threads of the base fabric, 84 decitex/36 filaments regular polyester threads and, as the pile threads, an 84 decitex/36 filaments polyester black dope-dyed thread and an 84 decitex/72 filaments polyester processed thread obtained by the above-mentioned two heater false twist method. Two sheets of the base fabric were knitted together by the pile threads using a double Raschel machine. The knitting was carried out so that the proportion of black dope-dyed threads in the threads forming the pile threads was 25 wt %, the knitting gauge was 22, and the course density on the machine was 43. The black dope-dyed thread was incorporated parallel to the knitting direction and arranged so that the bundles of black dope-dyed thread formed uniform vertical stripes having 5 stripes/cm in the longitudinal direction, and the bundles had a width of 1000 $\mu$m±200 $\mu$m when viewed from the top of the pile. The two sheets of base fabric so obtained were then cut centrally to give two pieces of light-shielding knitted pile. The pile threads so cut had a length of 2.2 mm. The base fabric obtained by cutting centrally in this way was then subjected to a pre-shearing step in which the length of the pile threads was adjusted to 1.6 mm and following this the pile was brushed while heating at 120° C. The pile was further subjected to a preset step in which the pile thread was crimped by heating at 190° C., a dyeing step for the purpose of introducing light-shielding properties, then a drying step, and finally a shearing step to adjust the length of the pile thread to 1.45 mm.

As a result, a light-shielding cloth having a compression characteristic that showed a change in thickness of 0.4 mm with a load of 0.49 N/cm² and a change in thickness of 0.6 mm with a load of 1.96 N/cm² when the pile thickness was 1.6 mm was obtained. The course density was 48, the wale density was 26 and the pile density was about 49,000 filaments/cm².

The pile density by the number of single filaments per square centimeter is (the course density per inch)×(the wale density per inch)×(the average number of single filaments per thread)×(the number of threads per multi-thread)/2.54/2.54=48×26×((36×1+72×3)4)×4/2.54/2.54=48,747= about 49,000.

In order to form an adhesive layer via which the light-shielding cloth would be bonded to a cartridge main body, a filling agent layer was formed by uniformly coating on the base fabric surface a vinyl acetate type aqueous emulsion resin and drying it so as to have a dry coat weight of 40 gm². The vinyl acetate type emulsion used here had a solids content of 50% and a viscosity of 100,000 mPa·sec. Subsequently, a toluene solvent based adhesive having as a main component EVA, which is a hot-melt adhesive, was uniformly coated and dried to give a coat weight of 70 g/m². The adhesive having as a main component EVA had a solids content of 28% and was used by heating it at 65° C. to give a viscosity of 700 mPa·sec. The filling agent and the hot-melt adhesive that were used were mixed with a black dye at 2 wt % by dispersing it well prior to application. The light-shielding cloth thus prepared was slit into ribbons having widths of 11.5 mm and 9.5 mm to give light-shielding cloth pieces of the present invention. In these light-shielding cloth pieces, the stripes of the black dope-dyed threads and the black-dyed threads were arranged parallel to the longitudinal direction of the light-shielding cloth pieces.

Subsequently, the light-shielding cloth ribbons so formed were continuously bonded to right and left edges of each of a plurality of cartridge shell-forming sheets while employing conveying means for continuously conveying the plurality of sheets arranged so that the forward end and the back end of adjoining sheets were in close contact with each other, that is to say, the right edges and the left edges of the sheets were each arranged in a line, and pressing means for pressing the two long light-shielding cloth ribbons precoated with the adhesive against the right and left edges of the sheets that were being conveyed. The long light-shielding cloth ribbons so bonded were cut from their reverse sides between each of the sheets. The stripes of the black dope-dyed threads and the black-dyed threads were arranged substantially parallel to the width direction of a photographic film housed in the container. An ISO 400 sensitivity black-and-white film (Neopan 400 PRESTO (trade name) having spectral sensitivity in the infrared region (at 850 nm or on the long wavelength side thereof), manufactured by Fuji Photo Film Co., Ltd.) was wound around spools and housed in the cartridges, and the light-shielding properties and the drawing resistance were evaluated in this state.

Comparative Example 1

An 84 decitex/36 filaments polyester black dope-dyed thread was used that was prepared by the addition-prior-to-spinning method in which carbon black was added prior to a spinning step so that the amount of carbon black added was 5 wt % of the polymer resin mixture. The polyester black dope-dyed thread that was used as pile threads was processed by a two heater false twist method in which the thread was first subjected to crimping by a normal false twist method using a 3-shaft outer-contact type false twist friction texturing machine and then continuously fed again to a heater using overfeeding so as to re-set it. The knit fabric for the light-shielding cloth had a chain/inlay structure as disclosed in JU-B-7-50741. The knitted pile material was formed using, as the chain and inlay threads of the base fabric, 84 decitex/36 filaments polyester threads and, as the pile thread, an 84 decitex/36 filaments polyester black dope-dyed thread obtained by the above-mentioned two heater false twist method. Two sheets of the base fabric were knitted together by the pile thread using a double Raschel machine. The knitting was carried out so that the threads forming the pile were 100% black dope-dyed threads, the knitting gauge was 22, and the course density on the machine was 43. The two sheets of base fabric so obtained were then cut centrally to give two pieces of light-shielding knitted pile. The pile thread so cut had a length of 2.2 mm. The base fabric obtained by cutting centrally in this way was then subjected to a pre-shearing step in which the length of the pile was adjusted to 1.6 mm and the pile was brushed while heating at 120° C. The pile was further subjected to a preset step in which the pile was crimped by heating at 190° C., a black dyeing step for the purpose of introducing light-shielding properties, then a drying step, and finally a shearing step to adjust the length of the pile to 1.45 mm. As a result, a light-shielding cloth having a compression characteristic that showed a change in thickness of 0.4 mm with a load of 0.49 N/cm² and a change in thickness of 0.5 mm with a load of 1.96 N/cm² when the pile thickness was 1.6 mm was obtained. The course density was 48, the wale density was 26 and the pile density was about 28,000 filaments/cm². Thereinafter, the procedure of Example 1 was repeated to give a sample.

Comparative Example 2

The knit fabric for the light-shielding cloth had a chain/inlay structure as disclosed in JU-B-7-50741. The knitted pile material was formed using 33 decitex/18 filaments polyester threads as the chain and inlay threads of the base fabric and a 56 decitex/36 filaments polyester thread as the pile thread. Two sheets of the base fabric were knitted together by the pile thread using a double Raschel machine. The knitting was carried out so that the knitting gauge was 22 and the course density on the machine was 70. The two sheets of base fabric so obtained were then cut centrally to give two pieces of light-shielding knitted pile. The pile thread so cut had a length of 2.2 mm. The base fabric obtained by cutting centrally in this way was then subjected to a pre-shearing step in which the length of the pile was adjusted to 1.70 mm and the pile was brushed while heating at 120° C. The pile was further subjected to a preset step in which the pile was heated at 190° C. to give a light-shielding cloth having a compression characteristic that showed a change in thickness of 0.4 mm with a load of 0.49 N/cm² and a change in thickness of 0.7 mm with a load of 1.96 N/cm² when the pile thickness was 1.6 mm. The course density was 70, the wale density was 28 and the pile density was 41,000 filaments/cm². Subsequently, it was subjected to a dyeing step for the purpose of imparting light-shielding properties thereto, then a drying step, and finally a shearing step to adjust the length of the pile to 1.60 mm.

In order to form an adhesive layer via which the light-shielding cloth would be bonded to a cartridge main body, a filling agent layer was formed by uniformly coating on the base fabric surface a vinyl acetate type aqueous emulsion resin and drying it so as to have a dry coat weight of 40 g/m².

The vinyl acetate type emulsion used here had a solids content of 50% and a viscosity of 100,000 mPa·sec. Subsequently, a toluene solvent based adhesive having as a main component EVA, which is a hot-melt adhesive, was uniformly coated and dried to give a coat weight of 70 g/m$^2$. The adhesive having as a main component EVA had a solids content of 28% and was used by heating it at 65° C. to give a viscosity of 700 mPa·sec. The filling agent and the hot-melt adhesive used were mixed with a black dye at 2 wt % by dispersing it well prior to application.

The light-shielding cloth thus prepared was slit into widths of 11.5 mm and 9.5 mm to give light-shielding cloth pieces used in a light-shielding container of the present invention.

Comparative Example 3

An 84 decitex/36 filaments polyester multifilament thread was used as the black dope-dyed thread and was prepared by the addition-prior-to-spinning method in which carbon black was added prior to a spinning step so that the amount of carbon black added was 5 wt % of the polymer resin mixture. The polyester black dope-dyed thread and polyester thread that were used as pile threads were processed by the same two heater false twist method as in Example 1. The knit fabric for the light-shielding cloth had a chain/inlay structure as disclosed in JU-B-7-50741. The knitted pile material was formed using, as the chain and inlay threads of the base fabric, 84 decitex/36 filaments regular polyester threads and, as the pile threads, an 84 decitex/36 filaments polyester black dope-dyed thread and an 84 decitex/36 filaments polyester thread obtained by the above-mentioned two heater false twist method. Two sheets of the base fabric were knitted together by the pile threads using a double Raschel machine. The knitting was carried out so that the proportion of the black dope-dyed threads in the pile was 25 wt %, the knitting gauge was 22, and the course density on the machine was 43. The black dope-dyed thread was incorporated parallel to the knitting direction and arranged so that the bundles of black dope-dyed thread formed uniform vertical stripes at 5 stripes/cm in the longitudinal direction. The two sheets of base fabric so obtained were then cut centrally to give two pieces of light-shielding knitted pile. The pile thread so cut had a length of 2.2 mm. The base fabric obtained by cutting centrally in this way was then subjected to a pre-shearing step in which the length of the pile was adjusted to 1.6 mm and the pile was brushed while heating at 120° C. The pile was further subjected to a preset step in which the pile was crimped by heating at 190° C., a black dyeing step for the purpose of introducing light-shielding properties, then a drying step, and finally a shearing step to adjust the length of the pile to 1.45 mm. As a result, a light-shiedling shielding cloth having a compression characteristic that showed a change in thickness of 0.4 mm with a load of 0.49 N/cm$^2$ and a change in thickness of 0.5 mm with a load of 1.96 N/cm$^2$ when the pile thickness was 1.6 mm was obtained. The course density was 48, the wale density was 26 and the pile density was about 28,000 filaments/cm Thereinafter, the procedure of Example 1 was repeated to give a sample.

Comparative Example 4

An 84 decitex/72 filaments polyester thread processed by the same two heater false twist method as in Example 1 was used as a pile thread. The knit fabric for the light-shielding cloth had a chain/inlay structure as disclosed in JU-B-7-50741. The knitted pile material was formed using 84 decitex/36 filaments polyester threads as the chain and inlay threads of the base fabric and the above-mentioned 84 decitex/36 filaments polyester thread as the pile thread. Two sheets of the base fabric were knitted together by the pile thread using a double Raschel machine. The knitting was carried out so that the knitting gauge was 22 and the course density on the machine was 43. The two sheets of base fabric so obtained were then cut centrally to give two pieces of light-shielding knitted pile. The pile thread so cut had a length of 2.2 mm. The base fabric obtained by cutting centrally in this way was then subjected to a pre-shearing step in which the length of the pile was adjusted to 1.6 mm and the pile was brushed while heating at 120° C. The pile was further subjected to a preset step in which the pile was crimped by heating at 190° C., a black dyeing step for the purpose of introducing light-shielding properties, and finally a shearing step to adjust the length of the pile to 1.45 mm. As a result, a light-shielding shielding cloth having a compression characteristic that showed a change in thickness of 0.4 mm with a load of 0.49 N/cm$^2$ and a change in thickness of 0.7 mm with a load of 1.96 N/cm$^2$ when the pile thickness was 1.6 mm was obtained. The course density was 48, the wale density was 26 and the pile density was about 56,000 filaments/cm$^2$. Thereinafter, the procedure of Example 1 was repeated to give a sample.

Comparative Example 5

A sample was prepared by the same method as in Comparative Example 4 except that ISO 400 color negative film (FUJICOLOR SUPERIA 400 (registered trademark), manufactured by Fuji Photo Film Co., Ltd.) having no spectral sensitivity in the infrared region (850 nm) was wound around a spool and housed in a cartridge instead of the film having spectral sensitivity in the infrared region (850 nm).

TABLE 1

|  | Example | Comparative Example | | | | |
| --- | --- | --- | --- | --- | --- | --- |
|  | 1 | 1 | 2 | 3 | 4 | 5 |
| Pile density (filaments/cm$^2$) | 49,000 | 28,000 | 41,000 | 28,000 | 56,000 | 56,000 |
| Proportion of black dope-dyed threads (wt %) | 25 | 100 | 0 | 25 | 0 | 0 |
| Black dope-dyed thread (dtex/fil) | 84/36 | 84/36 | — | 84/36 | — | — |
| Single filament fineness of black dope-dyed thread (dtex) | 2.33 | 2.33 | — | 2.33 | — | — |
| Black-dyed thread (dtex/fil) | 84/72 | — | 56/36 | 84/36 | 84/72 | 84/72 |
| Single filament fineness of black-dyed thread (dtex) | 1.17 | — | 1.56 | 2.33 | 1.17 | 1.17 |

TABLE 1-continued

| | Example | Comparative Example | | | | |
|---|---|---|---|---|---|---|
| | 1 | 1 | 2 | 3 | 4 | 5 |
| Average single filament fineness (dtex) | 1.46 | 2.33 | 1.56 | 2.33 | 1.17 | 1.17 |
| Light-shielding properties | AA | AA | CC | AA | CC | AA |
| Drawing resistance | AA | CC | AA | CC | AA | AA |

The following points are clear from the results in Table 1.

In Comparative Example 1 the pile section is formed from an 84 decitex/36 filaments black dope-dyed processed thread alone. The black dope-dyed thread is thick (large single filament fineness) and rigid. As a result, the drawing resistance is high, which is a problem.

Comparative Example 2 illustrates a pile section formed from 56 decitex/36 filaments black-dyed regular threads. Since the black thread is fine (small single filament fineness), the drawing resistance is low. However, the light absorption in the infrared region is insufficient, and the physical strength of the pile is insufficient, thereby resulting in poor light-shielding properties.

Comparative Example 3 illustrates the use of a thicker 84 decitex/36 filaments black-dyed thread, which is the same size as that of the black dope-dyed thread, in the same manner as in Example 1. However, the average single filament fineness increases, thereby causing a problem of high drawing resistance.

Comparative Example 4 is the same as Comparative Example 2 except that finer 84 decitex/72 filaments black-dyed threads were used. Although the drawing resistance is desirably low, the light absorption in the infrared region is insufficient, thereby resulting in poor light-shielding properties.

Comparative Example 5 is the same as Comparative Example 4 except that the light-sensitive material was changed to one having no sensitivity in the infrared region. As a result, since the light-sensitive material had no sensitivity in the infrared region, the absence of black dope-dyed threads caused no problem in the light-shielding properties.

Evaluation Methods

Thickness: Measured using a Peacock model G dial gauge.

Light-shielding properties: A sample was conditioned by standing at room temperature for 24 hours and then exposed to light by applying light at 90,000 lux to the port opening for 30 minutes, the photographic film was developed and the photographic image was evaluated visually in terms of light fogging due to light invasion.

The evaluation criteria in Table 1 above are as follows. M: the length of fogging in the perforation section at a position in the first wind from the port opening is less than 1 mm toward the photographic image area, BB: the length of fogging in the perforation section at a position in the first wind from the port opening is less than 2 mm toward the photographic image area, CC: the length of fogging in the perforation section at a position in the first wind from the port opening is 2 mm or more toward the photographic image area.

Drawing resistance: A sample was conditioned by standing at room temperature for 24 hours and then subjected to a measurement of drawing force using an Instron Tensile Tester.

Evaluation criteria in Table 1 above are as follows. AA: the maximum drawing force was less than 200 gf, BB: the maximum drawing force was 200 gf or more and less than 250 gf, and CC: the maximum drawing force was 250 gf or more and less than 300 gf.

Although the present invention has been fully described by way of preferred embodiments thereof with reference to the accompanying drawings, various changes and modifications will be apparent to those having skill in the field. Therefore, unless these changes and modifications otherwise depart from the scope of the present invention, they should be construed as being included therein.

What is claimed is:

1. A light-shielding container for a light-sensitive material comprising:
    a light-shielding cloth attached to an opening in the container through which the light-sensitive material is passed, the light-shielding cloth shielding the opening from light and comprising:
        a base fabric; and
        a pile section formed by incorporating pile threads into the base fabric, the pile section comprising:
            a black dope-dyed thread pile section formed by incorporating black dope-dyed threads containing carbon black; and
            a black-dyed thread pile section formed by incorporating black-dyed threads;
    wherein the proportion of the black dope-dyed thread pile section in the total pile section is 5 wt % to 60 wt %;
    wherein the single filament fineness of the black dope-dyed threads is thicker than that of the black-dyed threads;
    wherein the overall pile density of the black dope-dyed threads and the black-dyed threads is 30,000 filaments/cm$^2$ to 55,000 filaments/cm$^2$; and
    wherein the black dope-dyed thread pile section and the black-dyed thread pile section are arranged in stripes that are substantially orthogonal to the direction in which the light-sensitive material is passed.

2. The light-shielding container for a light-sensitive material according to claim 1, wherein the average single filament fineness (decitex) given by the equation below is in the range of 1 to 2, where A denotes the single filament fineness of the black dope-dyed threads, X wt % denotes the proportion of the black dope-dyed threads in the pile section, B denotes the single filament fineness of the black-dyed threads, and Y wt % denotes the proportion of the black-dyed threads in the pile section:

$$\text{Average single filament fineness} = \{A \times (X/100) + B \times (Y/100)\}/2.$$

3. The light-shielding container for a light-sensitive material according to claim 2, wherein the single filament fineness of the black-dyed threads is 2 decitex or less.

4. The light-shielding container for a light-sensitive material according to claim 1, wherein the pile threads forming the black dope-dyed threads and the black-dyed threads are crimped threads.

5. The light-shielding container for a light-sensitive material according to claim 1, wherein the base fabric is a warp knitted structure comprising a chain thread and an inlay thread.

6. The light-shielding container for a light-sensitive material according to claim 1, wherein the light-shielding cloth is prepared using the black dope-dyed threads and, instead of the black-dyed threads, undyed threads that have not been dyed black, and the whole light-shielding cloth is then dyed black using a dye to convert the undyed threads into the black-dyed threads.

7. A light-sensitive material package comprising:
a light-shielding container for a light-sensitive material; and
a light-sensitive material that has sensitivity to light at 850 nm and is housed in the container, the light-shielding container for a light-sensitive material comprising:
a light-shielding cloth attached to an opening in the container through which the light-sensitive material is passed, the light-shielding cloth shielding the opening from light and comprising:
a base fabric; and
a pile section formed by incorporating pile threads into the base fabric, the pile section comprising:
a black dope-dyed thread pile section formed by incorporating black dope-dyed threads containing carbon black; and
a black-dyed thread pile section formed by incorporating black-dyed threads;
wherein the proportion of the black dope-dyed thread pile section in the total pile section is 5 wt % to 60 wt %;
wherein the single filament fineness of the black dope-dyed threads is thicker than that of the black-dyed threads;
wherein the overall pile density of the black dope-dyed threads and the black-dyed threads is 30,000 filaments/cm$^2$ to 55,000 filaments/cm$^2$; and
wherein the black dope-dyed thread pile section and the black-dyed thread pile section are arranged in stripes that are substantially orthogonal to the direction in which the light-sensitive material is passed.

8. The light-sensitive material package according to claim 7, wherein the average single filament fineness (decitex) given by the equation below is in the range of 1 to 2, where A denotes the single filament fineness of the black dope-dyed threads, X wt % denotes the proportion of the black dope-dyed threads in the pile section, B denotes the single filament fineness of the black-dyed threads, and Y wt % denotes the proportion of the black-dyed threads in the pile section:

$$\text{Average single filament fineness} = \{A \times (X/100) + B \times (Y/100)\}/2.$$

9. The light-sensitive material package according to claim 8, wherein the single filament fineness of the black-dyed threads is 2 decitex or less.

10. The light-sensitive material package according to claim 7, wherein the pile threads forming the black dope-dyed threads and the black-dyed threads are crimped threads.

11. The light-sensitive material package according to claim 7, wherein the base fabric is a warp knitted structure comprising a chain thread and an inlay thread.

12. The light-sensitive material package according to claim 7, wherein the light-shielding cloth is prepared using the black dope-dyed threads and, instead of the black-dyed threads, undyed threads that have not been dyed black, and the whole light-shielding cloth is then dyed black using a dye to convert the undyed threads into the black-dyed threads.

* * * * *

UNITED STATES PATENT AND TRADEMARK OFFICE
CERTIFICATE OF CORRECTION

PATENT NO. : 6,669,019 B2
DATED : September 30, 2003
INVENTOR(S) : Satoru Tsurumaki, Masazumi Tomoda and Toshihiro Kondou It is certified that error appears in the above-identified patent and that said Letters Patent is hereby corrected as shown below:

Column 4,
Line 11, delete "/2"
Line 43, delete "/2"

Column 18,
Line 60, delete "/2"

Column 20,
Line 16, delete "/2"

Signed and Sealed this

Thirteenth Day of July, 2004

JON W. DUDAS
*Acting Director of the United States Patent and Trademark Office*